Nov. 23, 1965   G. H. RÖHM   3,219,074
POWER TOOL ATTACHMENT FOR MANIPULATING FASTENERS
Filed June 20, 1963
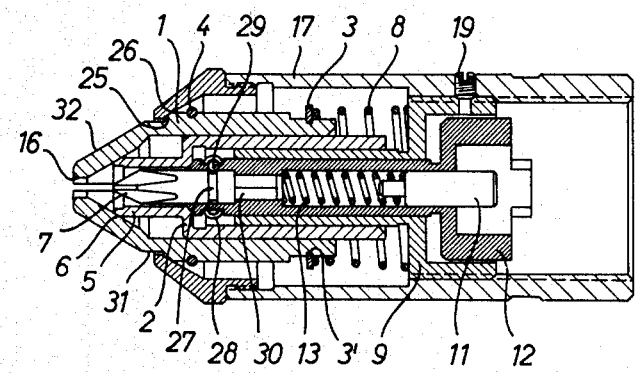
INVENTOR
GÜNTER HORST RÖHM
BY: Nolte & Nolte
ATTORNEYS 3,219,074
POWER TOOL ATTACHMENT FOR
MANIPULATING FASTENERS
Günter Horst Röhm, Sontheim (Brenz), Germany
Filed June 20, 1963, Ser. No. 289,255
Claims priority, application Germany, Dec. 14, 1962,
Sch 32,474
9 Claims. (Cl. 144—32)

This invention pertains to a power tool attachment for manipulating fasteners and more particularly to an electrically or pneumatically driven power tool attachment for manipulating self-tapping screws for sheet metal or the like.

Attachments for manipulating machine screws or wood screws have been made in which a chuck jaw system is biased into a forward limiting position with respect to a surrounding housing that has a forward tapering portion by a spring which engages the rear end surfaces of the chuck jaw system. The forward limiting position of the chuck jaw system of these known attachments is predetermined by stop pins formed on the chuck jaws, the stop pins being engaged by the forward tapering portion of the housing. Such a construction, however, prevents accurate centering and longitudinal (axial) guiding of the chuck jaws along the inner surfaces of the housing.

It is accordingly an object of my invention to provide a power tool attachement for manipulating fasteners in which centering and longitudinal guiding of the chuck jaw system is greatly improved over the known devices.

With this object in view, the present invention relates to a power tool attachment for manipulating fasteners having a head and a shank portion and which comprises an elongated sleeve-like housing which has an open frustoconical forward end portion, and a chuck jaw system having a forward and a rear portion received in the housing and movable in the longitudinal direction of the housing. A spring which biases the chuck jaw system into a forward limiting position engages a snap ring which holds together the rear portion of the chuck jaw system, and the forward limiting position of the chuck jaw system is predetermined by shoulder portions that are provided on the outer surface of the chuck jaws in the forward portion thereof and which abut the sleeve-like housing.

The force of the spring is thus evenly distributed across the snap ring to the individual chuck jaws thereby ensuring that the longitudinal centered guidance of the chuck jaw system and of the screws accordingly is not adversely affected by the pressure of the spring on one particular chuck jaw.

According to another aspect of the present invention, the shoulder portions provided on the forward portion of the outer surface of the chuck jaws are formed with a wide face which abuts the sleeve-like housing and by means of which a longitudinally directed, centered guidance of the chuck jaw system is also ensured.

According to yet another aspect of the present invention, the snap ring which holds together the rear portion of the chuck jaw system is constructed flat and wide, so that it projects far to the outside over the outer surfaces of the chuck jaw system and provides a wide surface area for supporting the spring.

According to still another aspect of the invention, the annular shoulder which predetermines the forward limiting position of the chuck jaw system is appropriately formed of a plurality of shoulder segments machined across the entire outer surface of the chuck jaws.

According to a further aspect of the invention, the shoulder portions which predetermine the forward limiting position of the chuck jaws are inclined with respect to the longitudinal axis of the housing, and the stop or abutment face of the sleeve-like housing which cooperates with the shoulder portions are provided with substantially the same inclination with respect to the longitudinal axis of the housing and with substantially the same radius of curvature as that of the shoulder portions so that these surfaces slide smoothly one on another for longitudinal and centered guidance of the chuck jaws. Due to the particular shape of the shoulder portions formed on the chuck jaws and the abutment faces of the housing cooperating therewith, the centered and longitudinal guidance of the chuck jaws which grip the screw shank when the self-tapping screw is being driven, is greatly improved in that the chuck jaws are guided not only at their inner surfaces by the conical outer surfaces of the center sleeve but also on their outside surfaces in the vicinity of these shoulder portions by the abutment faces of the housing.

The foregoing and other objects, advantages and features of the invention will be apparent from the preferred embodiment illustrated by way of example in the accompanying drawing in conjunction with the following detailed description.

In the single figure of the drawing a power tool attachment constructed in accordance with the invention is shown in longitudinal section.

There is shown in the figure a chuck jaw system 1 which preferably has three chuck jaws (only two shown) symmetrically arranged about the longitudinal axis of the attachment, and a coaxial center sleeve 2 disposed within the chuck jaw system 1. The chuck jaw system is held together in its rear portion by a snap ring 3 which is set into a groove 3' provided in the chuck jaws. The snap ring 3 has a substantially wide surface area extending radially outwardly beyond the outer surfaces of the chuck jaw system so as to provide an abutment for the compression spring 8. The forward portion of the chuck jaw system 1 is held together by a helical spring 4 formed into a continuous ring.

The center sleeve 2 has a neck portion 5 of reduced diameter which is provided with an outer edge 6 which grips the head of a screw which is to be manipulated. The points or gripping portions 16 of the chuck jaws have gripping surfaces that are smoothly formed. These surfaces can, however, be provided with threads which correspond to the threads of the screws that are to be manipulated. In order to facilitate the grasping of the screws, the forward gripping surfaces 16 of the chuck jaw system 1 can be beveled so that they form a funnel-shaped opening tapering inwardly.

The guide or center sleeve 2 is coaxially mounted on a guide bushing 9 within the chuck jaw system 1 and is slidable in the longitudinal direction of the attachment. The driving mechanism of the hand-held power tool (not shown) which is preferred for use with the attachment constructed in accordance with this invention is preferably driven by an electric motor or pneumatically and is connected through a suitable coupling to the shaft 12. The shaft 12 has a longitudinally extending bore and is provided at its forward end with a rectangular opening 30 into which a tool can be interchangeably inserted. The tool, such as a screwdriver 7 or the like, is retained in the shaft 12 by a spring washer 28 over a ball 29 that is engaged in a groove 27 formed in the tool 7. In the axial bore of the shaft 12 there is arranged a compression spring 13 which cooperates with the coupling pin 11. The guide sleeve or bushing 9 is threaded in the sleeve-like housing 17 with a left-handed thread and is consequently therefore adjustable, and is clamped against relative rotation by a set screw 19.

The inner surfaces of the chuck jaws extend substantially conically from its apex at the gripping surfaces 16 of the chuck jaws 1 in a rearward widening direction. The outer face at the forward end of the center sleeve 2 is beveled so that longitudinal movement of this beveled surface together with the conical surfaces of the chuck jaws causes expansion of the chuck jaw system 1 with the consequent release of the screw gripped by the chuck jaws.

The chuck jaw system 1 is held on the outside by the cylindrical sleeve-like housing 17. When the chuck jaws 1 do not hold a screw, the shoulder portions 25 and the abutment faces 26 have substantially the same inclination with respect to the longitudinal axis of the housing 17 and substantially the same radius of curvature, so that sliding of the surfaces against one another is facilitated and the chuck jaws are simultaneously centered and longitudinally guided. The outer surfaces 32 of the chuck jaws 1 also have the same inclination as the abutment faces 26 so that the outer surfaces 32 at the opening of the chuck jaw system 1 can glide along the abutment faces 26 while the jaws maintain their centered and longitudinal guidance and can also hold the screws of varying screw shank diameters centered and guide them longitudinally.

Between the shoulder portions 25 and the inclined outer surfaces 32 of the chuck jaws, a substantially cylindrical portion 31 is provided. The inclined outer surfaces 32 of the chuck jaws 1 have substantially the same curvature at their rearmost end closest to the shoulder portions 25 as the curvature of the abutment faces 26 of the sleeve-like housing 17, so that guiding a screw shank is particularly improved over prior known devices particularly when screws with relatively thick screw shanks are manipulated.

While the invention has been illustrated and described as embodied in a power tool attachment for manipulating fasteners, it is not intended to be limited to the details shown, since various modifications and structural changes may be made without departing in any way from the spirit of the present invention.

Thus for example the fasteners that can be manipulated by the attachment may be nails or tacks and instead of a rotary driven screwdriving tool in the attachment a reciprocating power hammer may be employed.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a power tool attachment for manipulating fasteners, elongated housing means having an open frustoconical forward end portion; a chuck jaw system received in said housing means and movable in the longitudinal direction of said housing means, said system having a forward portion and a rear portion, said forward portion being formed with shoulder means; snap ring means for holding together the rear portion of said chuck jaw system and being held on said system against longitudinal movement with respect to said system, said snap ring means having a substantially wide surface area extending radially outwardly beyond the outer surfaces of said chuck jaw system and said rear portion of said chuck jaw system being surrounded by and extending rearwardly beyond said snap ring means; and spring means surrounding said rear portion of said chuck jaw system where said rear portion extends rearwardly beyond said snap ring means, said spring means abutting said surface area of said snap ring means for yieldably biasing said chuck jaw system into a forward limiting position with respect to said housing means in which the shoulder means of said chuck jaw system engage said frustoconical forward end portion of said housing means.

2. In a power tool attachment as recited in claim 1, said shoulder means of said forward portion being substantially annular and comprising a plurality of shoulder segments machined across the entire outer surface of jaws of said chuck jaw system.

3. In a power tool attachment as recited in claim 1, said housing means being cylindrical and said open frustoconical forward end portion thereof having an inner curved abutment face inclined with respect to the longitudinal axis of said housing means, said shoulder means being provided with an outer curved face having substantially the same radius of curvature as said curved abutment face and having substantially the same inclination with respect to the longitudinal axis of said housing means as said abutment face, said outer curved face of said shoulder means slidably engaging said inner curved abutment face of said housing means in said forward limiting position of said chuck jaw system.

4. In a power tool attachment as recited in claim 1, said open frustoconical forward end portion of said housing means having an inner curved abutment face inclined with respect to the longitudinal axis of said housing means, said chuck jaw system having jaws provided with an outer surface portion forward of said shoulder means having substantially the same inclination as said abutment face, said outer curved face of said shoulder means and said outer surface of said jaws engaging said inner curved abutment face of said housing means in said forward position of said chuck jaw system when a fastener is gripped by said jaws.

5. In a power tool attachment as recited in claim 4, at least a part of said outer surface portion of said jaws closest to said shoulder means having a radius of curvature substantially the same as that of said abutment face.

6. In a power tool attachment as recited in claim 1, said open frustoconical forward end portion of said housing means having an inner curved abutment face inclined with respect to the longitudinal axis of said housing means, said forward portion of said chuck jaw system being provided with an outer surface portion forward of and spaced from said shoulder means by a substantially cylindrical surface portion, said outer surface portion of said chuck jaw system engaging said abutment face of said housing means in said forward position of said chuck jaw system.

7. A power tool attachment for manipulating fasteners having a head and a shank, comprising elongated housing means having an open frustoconical forward end portion; a chuck jaw system received in said housing means and movable in the longitudinal direction of said housing means, said system having a hollow forward and rear portion, said forward portion being formed with shoulder means and comprising a plurality of jaws arranged frustoconically at the front end thereof, said jaws being radially expandable for receiving a fastener therebetween; means for mounting a fastener driving tool in the interior of said chuck jaw system; a center sleeve member coaxially mounted within said chuck jaw system and slidable longitudinally in said housing means, said center sleeve member having a forward portion provided with conical outer surface means for engaging the inner surfaces of said jaws when the latter are expanded for gripping the head of the fastener while the shank thereof is gripped by said jaws; snap ring means for holding together the rear portion of said chuck jaw system and being held on said system against longitudinal movement with respect to said system; and spring means abutting said snap ring means for yieldably biasing said chuck jaw system to a forward limiting position with respect to said housing means prior to receiving a fastener in said chuck jaw system in which the shoulder means of said chuck jaw system engage said frustoconical forward end portion of said housing means.

8. A power tool attachment for manipulating screws such as self-tapping screws for sheetmetal, comprising cylindrical housing means having an open frustoconical forward end portion; a chuck jaw system received in said housing means and movable in the longitudinal direction of said housing means, said system having hollow forward and rear portions, said forward portion being formed with shoulder means and comprising a plurality of jaws arranged substantially frustoconically at the front end thereof, said jaws being radially expandable for gripping the shank of a screw therebetween; means for mounting a screwdriving tool in the interior of said chuck jaw system, said mounting means comprising a hollow shaft capable of being operatively connected to a power tool; a center sleeve member mounted in said chuck jaw system coaxial with and at least partly surrounding said hollow shaft, said center sleeve member being movable in the longitudinal direction of said housing means and having a forward portion provided with conical outer surface means for engaging the inner surfaces of said jaws when the latter are expanded and adapted to grip the head of a screw when its shank is gripped between said jaws; snap ring means for holding together the rear portion of said chuck jaw system and being held on said system against longitudinal movement with respect to said system; and spring means abutting said snap ring means for yieldably biasing said chuck jaw system to a forward limiting position prior to gripping a screw in which the shoulder means of said chuck jaw system engage said frustoconical forward end portion of said housing means.

9. A power tool attachment comprising, an outer elongated tubular housing having a front open end provided at its interior with an inner frustoconical surface extending coaxially around a central axis of said housing and increasing in diameter from the front end of said housing, toward the interior thereof, a plurality of elongated gripping jaws extending from the interior of said housing through said front open end thereof and also extending generally parallel and being uniformly distributed about said axis, each gripping jaw having an outer surface of the same inclination and curvature as, and slidably engaging, said inner frustoconical surface of said housing, and each jaw having an inner surface of substantially the same inclination and curvature as said outer surface, and an inner centering sleeve situated coaxially in said housing and extending into the interior of a space surrounded by said jaws, said centering sleeve having a front end provided with an exterior frustoconical surface of the same inclination and curvature as said inner surfaces of said jaws and slidably engaging said latter inner surfaces, whereby said jaws, during axial movement, will move toward and away from said axis to accommodate articles of different diameters while guided at said outer surfaces by said inner surface of said housing, at said front end of the latter, and at their inner surfaces by said centering sleeve.

References Cited by the Examiner
UNITED STATES PATENTS 2,138,913   12/1938   Fotsch.
2,684,698   7/1954    Schaff _____ 144—32
3,042,244   7/1962    Van Hecke _____ 279—58

WILLIAM W. DYER, JR., *Primary Examiner.*

DONALD R. SCHRAN, *Examiner.*